(12) United States Patent
Keaton et al.

(10) Patent No.: US 6,995,900 B2
(45) Date of Patent: Feb. 7, 2006

(54) METHOD OF MAKING A SHORT-PASS FIBER WITH CONTROLLED CUT-OFF WAVELENGTH

(75) Inventors: Gregory L. Keaton, San Francisco, CA (US); Mark A. Arbore, Los Altos, CA (US); Thomas J. Kane, Menlo Park, CA (US)

(73) Assignee: JDS Uniphase Corporation, San Jose, CA (US)

( * ) Notice: Subject to any disclaimer, the term of this patent is extended or adjusted under 35 U.S.C. 154(b) by 508 days.

(21) Appl. No.: 10/348,802

(22) Filed: Jan. 21, 2003

(65) Prior Publication Data

US 2004/0141228 A1 Jul. 22, 2004

(51) Int. Cl.
*H01S 3/00* (2006.01)
*C03B 37/023* (2006.01)
*G02B 6/02* (2006.01)

(52) U.S. Cl. .................. 359/341.1; 385/127; 65/385
(58) Field of Classification Search ............ 359/341.1; 385/127; 65/385, 435, 390, 413
See application file for complete search history.

(56) References Cited

U.S. PATENT DOCUMENTS

| | | | |
|---|---|---|---|
| 4,515,436 A | 5/1985 | Howard et al. | |
| 4,764,933 A | 8/1988 | Kozlovsky et al. | |
| 5,056,888 A | 10/1991 | Messerly et al. | |
| 5,260,823 A | 11/1993 | Payne et al. | |
| 5,392,154 A | 2/1995 | Chang et al. | |
| 5,452,116 A | 9/1995 | Kirkby et al. | |
| 5,473,714 A | 12/1995 | Vengsarkar | |
| 5,673,342 A | 9/1997 | Nelson et al. | |
| 5,801,858 A | 9/1998 | Roberts et al. | |
| 5,818,630 A | 10/1998 | Fermann et al. | |
| 5,852,690 A | 12/1998 | Haggans et al. | 385/37 |
| 5,867,305 A | 2/1999 | Waarts et al. | |
| 5,880,877 A | 3/1999 | Fermann et al. | |

(Continued)

FOREIGN PATENT DOCUMENTS

EP 0313209 A 4/1989

(Continued)

OTHER PUBLICATIONS

L.G. Cohen et al., "Radiating Leaky-Mode Losses in Single-Mode Lightguides with Depressed-Index Claddings," IEEE Journal of Quantum Electronics, vol. QE-18, No. 10, Oct. 1982, pp. 1467-72.

(Continued)

*Primary Examiner*—Mark Hellner
(74) *Attorney, Agent, or Firm*—Allen, Dyer, Doppelt, Milbrath & Gilchrist, P.A.

(57) ABSTRACT

A method of producing a short-pass fiber by drawing a preform for a depressed cladding fiber at a predetermined drawing ratio. The preform has a core of refractive index $n_0$, a depressed cladding surrounding the core and having a refractive index $n_1$, and a secondary cladding surrounding the depressed cladding and having a refractive index $n_2$. The core has a core cross-section and the depressed cladding has a depressed cladding cross-section that is larger than the core cross-section. The drawing ratio is determined based on the parameters of the preform measured along the axis of the preform and based on a desired minimum fundamental mode cutoff wavelength $\lambda_m$. The final core cross-section defines a fundamental mode cutoff wavelength $\lambda_c$ such that $\lambda_c \geq \lambda_m$ along the axis. Then the preform is pulled by the thus-determined drawing ratio to produce the short-pass fiber. In some embodiments a test section of the fiber is pulled first before pulling the short pass fiber.

17 Claims, 4 Drawing Sheets

U.S. PATENT DOCUMENTS

| | | | |
|---|---|---|---|
| 5,892,615 | A | 4/1999 | Grubb et al. |
| 5,930,030 | A | 7/1999 | Scifres |
| 5,933,271 | A | 8/1999 | Waarts et al. |
| 6,021,141 | A | 2/2000 | Nam et al. |
| 6,049,417 | A | 4/2000 | Srivastava et al. |
| 6,118,575 | A | 9/2000 | Grubb et al. |
| 6,154,321 | A | 11/2000 | Melville et al. |
| 6,181,465 | B1 | 1/2001 | Grubb et al. |
| 6,212,310 | B1 | 4/2001 | Waarts et al. |
| 6,278,816 | B1 | 8/2001 | Keur et al. |
| 6,288,835 | B1 | 9/2001 | Nilsson et al. ........... 359/341.3 |
| 6,301,271 | B1 | 10/2001 | Sanders et al. |
| 6,307,994 | B1 | 10/2001 | Paek et al. |
| 6,445,494 | B1 | 9/2002 | Nilsson et al. ........... 359/341.1 |
| 6,502,429 | B1 * | 1/2003 | Abe ............................ 65/382 |
| 6,535,679 | B2 * | 3/2003 | Yokoyama et al. ......... 385/127 |
| 6,556,757 | B2 | 4/2003 | Ellison et al. ............... 385/127 |
| 6,768,849 | B2 * | 7/2004 | DiGiovanni et al. ........ 385/123 |
| 6,909,538 | B2 * | 6/2005 | Arbore et al. ........... 359/341.1 |

FOREIGN PATENT DOCUMENTS

WO      WO 3086997 A1 * 10/2003

OTHER PUBLICATIONS

Ishikawa et al., "Novel 1500 nm-Band EDFA with Discrete Raman Amplifier," ECOC-2001, Post Deadline Paper.

Stolen et al., "Short W-Tunneling Fibre Polarizers," Electronics Letters, vol. 24, 1988, pp. 524-525.

*Erbium-Doped Fiber Amplifiers Fundamentals and Technology* by P. C. Becker, N. A. Olsson, and J. R. Simpson, chapter 2 (Optical Fiber Fabrication), published by Academic Press, pp. 13-42.

"Novel 1500 nm-band EDFA with discrete Raman Amplifier" by Ishikawa et al. Optical Communication, 2001 ECOC '01.

"Radiating Leaky-Mode Losses in Single-Mode Lightguides with depressed-Index Claddings" by Cohen et al. IEEE J Quantum Electron Oct. 1982, vol. QE-18, No. 10.

"A Method to predict the Raman gain spectra of german osilicate fibers with arbitrary index profiles" by Bromage et al. IEEE Photonics Technology Letters IEEE USA, vol. 14, No. 1, Jan. 2002.

"34dB Gain at 1500nm in S-Band EDFA with distributed ASE Suppression" by Arbore et al. ECOC 2002 $28^{th}$ European Conference on Optical Communication vol. 1 of 4 Conf 28, Sep. 9, 2002.

* cited by examiner

FIG. 4 ized cladding fiber with controlled cut-off wavelength.

METHOD OF MAKING A SHORT-PASS FIBER WITH CONTROLLED CUT-OFF WAVELENGTH

RELATED APPLICATIONS

This application is related to U.S. application Ser. No. 09/825,148 filed on Apr. 2, 2001 and to U.S. application Ser. No. 10/095,303 filed on 8 Mar. 2002.

FIELD OF THE INVENTION

The present invention relates generally to the making of short-pass fibers that use a depressed-cladding to establish a cut-off wavelength.

BACKGROUND OF THE INVENTION

Optical fibers, including communication fibers with low-impurity levels are made from preforms. A preform can be made by several methods. In general, these methods are divided into three categories: hydrolysis (reaction with $H_2O$), oxidation (reaction with $O_2$) and sol-gel (reactions with a suspension of silica).

For example, the hydrolysis method is accomplished by flowing $SiCl_4$ vapor into a hydrogen flame with the resulting "fumed" silica submicron particles collected on a rotating target. Various dopants may be added to the flame (e.g., $GeCl_4$, $POCl_3$). The cylinder produced in this manner is treated at a temperature near 800° C. with an atmosphere of $SOCl_2$ to reduce the OH content of the glass. Subsequently, a transparent glass preform is made by fusing the particles at a temperature of 1500° C., a process referred to as sintering. The processes involved in making preforms in accordance with the oxidation method involve deposition and sintering steps carried out inside substrate tubes. Sol-gel processing has been investigated primarily for the production of silica tubes used to overclad higher purity core and inner cladding regions of preforms.

A preform made by any of these techniques is drawn into an optical fiber. Drawing involves heating one end of the preform to the softening temperature and pulling it into a fiber at rates as high as 20 meters/second, or greater.

With the advent of more complex fiber designs there is a need to better control the refractive indices of the fiber's core and cladding, as well as the overall refractive index profile. Also, some fibers have additional cladding layers in which the refractive index has to be precisely controlled. Thus, it is necessary to add dopants to the primary glass constituent $SiO_2$, to change its refractive index, thus allowing control of the fiber waveguide design. Index-raising dopant ions (e.g., germanium, and aluminum) and index-lowering dopants (e.g., boron and fluorine) are introduced into the reaction stream as halide vapors carried by oxygen or an inert gas. The incorporation of the dopant ions in either the hydrolysis or oxidation processes is controlled by the equilibria established during dopant reaction, deposition, and sintering.

Variations in the refractive index due to these equilibria manifest in sawtooth patterns of refractive index in the cladding of the depressed cladding fiber and depressions in the refractive index in the center of the fiber. For this reason, production of depressed cladding fibers with highly accurate index profiles from drawn preforms poses a challenge. The addition of dopings of active materials into the preform, e.g., rare earth elements such as Er, Nd, Tm or Pr, further exacerbate the problem. In fact, for doped depressed cladding fibers index tolerances of up to 20% are common. For more information on the technology of making performs and drawing fibers the reader is referred to *Erbium-Doped Fiber Amplifiers Fundamentals and Technology* by P. C. Becker, N. A. Olsson, and J. R. Simpson, chapter 2 (Optical Fiber Fabrication), published by Academic Press, pp. 13–42 and references therein.

A short-pass fiber designed in a depressed cladding fiber is particularly susceptible to the above tolerance limitations. Specifically, short-pass fibers of the type described in U.S. patent application Ser. No. 09/825,148 filed on Apr. 2, 2001 and in U.S. patent application Ser. No. 10/095,303 filed on 8 Mar. 2002 are highly sensitive to tolerances in refractive index as well as radii of the core and cladding layers. That is because the cutoff wavelength and the roll-off loss curve of such short-pass fibers depend on these parameters.

Unfortunately, the prior art techniques are not capable of consistently delivering depressed cladding fibers within the refractive index and cross-sectional tolerances required for short-pass fibers with well-defined cutoff wavelength and roll-off loss curves. In view of this, it would be an advance in the art to provide a method for fabricating short-pass fiber.

OBJECTS AND ADVANTAGES

In view of the shortcomings of the prior art, it is a primary object of the present invention to provide a method for drawing short-pass fiber from performs. Specifically, it is an object of the invention to provide for drawing short-pass fibers that use a depressed cladding geometry to define a cutoff wavelength and an associated roll-off loss curve. It is a further object of the invention to provide a reliable method for drawing fibers that contain various types of dopants, including active materials such as rare earth ions. These and numerous other advantages of the present invention will become apparent upon reading the following description.

SUMMARY

The objects and advantages of the invention are achieved by a method of producing a short-pass fiber from a preform for a depressed cladding fiber. Such preform has a core of average refractive index $n_0$, a depressed cladding surrounding the core and having an average refractive index $n_1$, and a secondary cladding surrounding the depressed cladding and having an average refractive index $n_2$. The core has a core cross-section and the depressed cladding has a depressed cladding cross-section that is larger than the core cross-section. The core and depressed cladding cross-sections are measured. Then, a minimum fundamental mode cutoff wavelength $\lambda_m$ is set and a variation of the refractive indices $n_0$ and $n_1$ along an axis of the preform are measured. A drawing ratio is derived from the measured core cross-section, depressed cladding cross-section and the variation in the indices such that the core cross-section has a final value, e.g., final core radius in the case the core cross-section is circular, defining a fundamental mode cutoff wavelength $\lambda_c$ such that $\lambda_c \geq \lambda_m$ along the axis. Then the preform is pulled by the thus-determined drawing ratio to produce the short-pass fiber.

In some embodiments of the method the secondary cladding cross-section is adjusted before the pulling step. For example, the adjustment to the secondary cladding may involve augmenting it by a technique such as rod-in-tube (also sometimes called "sleeving") or outside vapor deposition (OVD). Alternatively, the secondary cladding may be reduced by a technique such as etching.

Preferably, the minimum fundamental mode cutoff wavelength $\lambda_m$ is selected such that in the drawn fiber it is at least 5 nm below cutoff wavelength $\lambda_c$ along the axis. This is done so that further adjustment of fundamental mode cutoff wavelength $\lambda_c$ is possible by standard techniques, such as stressing or bending of the fiber.

In a preferred embodiment, the step of pulling the preform is broken up into pulling a test section of the preform by the drawing ratio and then pulling the remainder of the preform. In particular, after pulling the test section the fundamental mode cutoff wavelength $\lambda_c$ in the test section is determined and the drawing ratio is adjusted to an adjusted drawing ratio based on the value of the fundamental mode cutoff wavelength $\lambda_c$ found in the test section. Then the remainder of the preform is pulled to the adjusted drawing ratio. The test section should be a representative portion of the preform, e.g., up to 20% of the preform.

As indicated above, it is important that a certain final value of the core cross-section be achieved. Hence, it is important to select the final value of the core cross-section, e.g., final core radius, and change the drawing ratio as necessary to achieve that final value. Since the value of the core cross-section typically varies along the axis of the preform, it is convenient to measure an average of the core cross-section and adjust the drawing ratio to achieve an average final value of the core cross-section, e.g., average final core radius, in the pulled short-pass fiber.

The method of the present invention can be practiced in many ways. A detailed description of the invention and the preferred and alternative embodiments is presented below in reference to the attached drawing figures.

DETAILED DESCRIPTION

Figure 1:
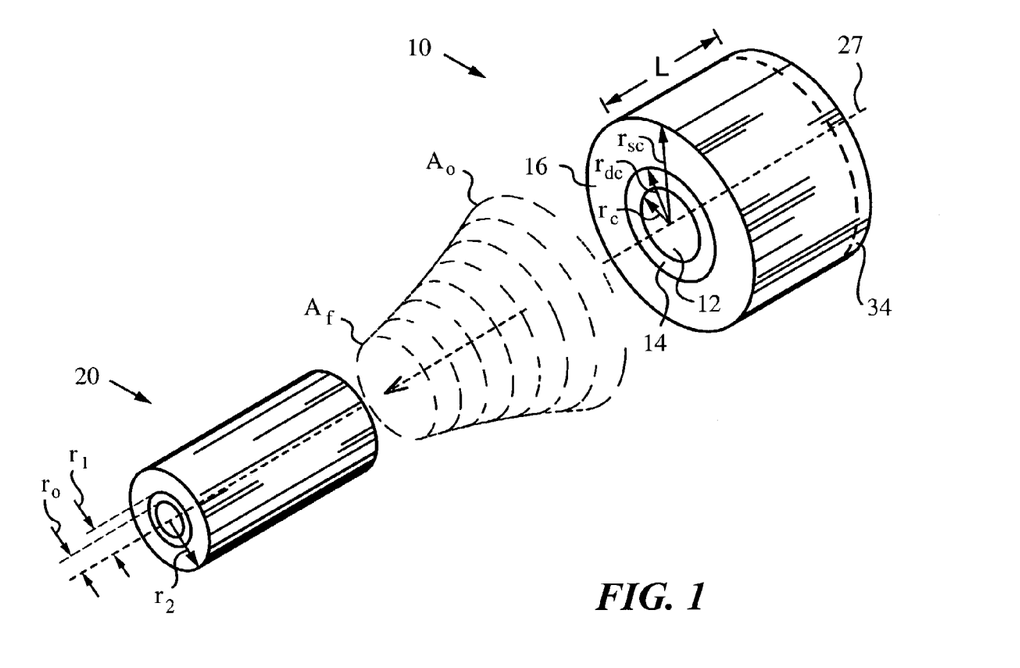
FIG. 1 is a diagram illustrating the pulling of a preform into a short-pass fiber with a depressed-profile.

The method of producing short-pass fibers in accordance with the invention will be best understood by initially examining a preform 10 for a depressed cladding fiber designed for pulling a short-pass fiber 20 as shown in FIG. 1. Preform 10 has a core 12 surrounded by a depressed cladding 14. A secondary cladding 16 surrounds depressed cladding 14. Preform 10 is made of primary glass constituent $SiO_2$ and is manufactured by hydrolysis, oxidation, sol-gel or any other suitable method.

Core 12 of preform 10 has a core cross-section that is circular and is described by a core radius $r_c$. Depressed cladding 14 and secondary cladding 16 have corresponding circular cross-sections described by radii $r_{dc}$ and $r_{sc}$, respectively. Core 12 has a refractive index $n_0$, depressed cladding 14 has a refractive index $n_1$ and secondary cladding 16 has a refractive index $n_2$. Refractive index $n_0$ of core 12 is the highest, while refractive index $n_1$ of depressed cladding 14 is the lowest. In the present embodiment, refractive index $n_0$ is attained by doping core 12 with index-raising dopant such as germanium or aluminum. Refractive index $n_1$ is attained by doping depressed cladding 14 with an index-lowering dopant such as boron or fluorine. Secondary cladding 16 remains undoped and its refractive index $n_2$ is that of the primary glass constituent $SiO_2$. The incorporation of index-raising dopant ions in core 12 and index-lowering dopant ions in depressed cladding 14 is performed in accordance with the hydrolysis or oxidation processes.

Figure 2A:
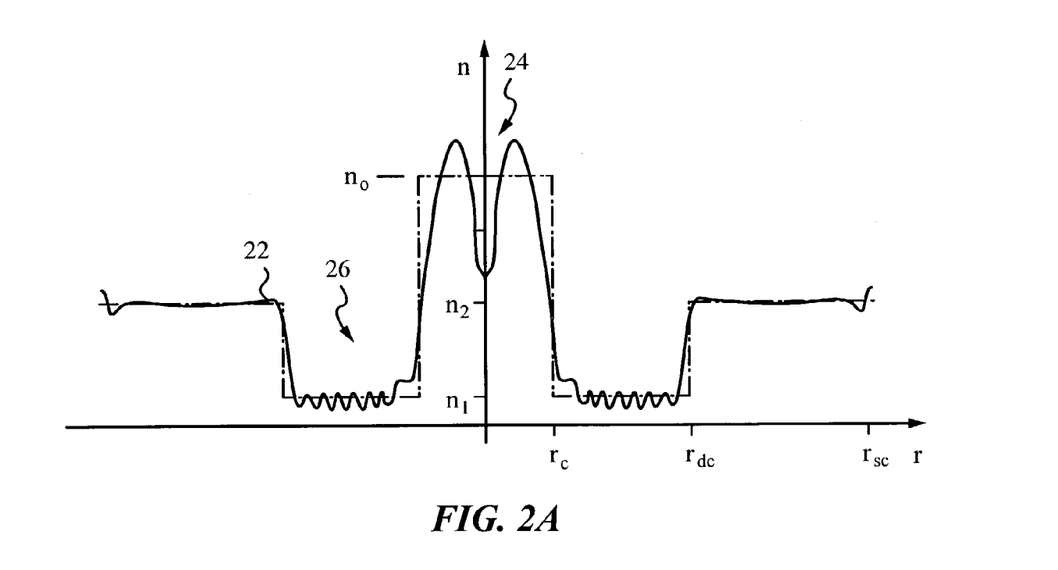
FIG. 2A is a graph illustrating the transverse portion of the refractive index profile in the preform of FIG. 1.

FIG. 2A is a graph illustrating a typical refractive index profile 22 obtained in practice in preform 20 as a function of radius (r), i.e., the transverse portion of index profile 22. The incorporation of index-raising dopant ions in core 12 and index-lowering dopant ions in depressed cladding 14 in either the hydrolysis or oxidation processes is controlled by the equilibria established during dopant reaction, deposition, and sintering. As a result, a depression 24 in refractive index is present in core 12 of preform 10. The equilibria further cause a sawtooth pattern 26 in refractive index to manifest in depressed cladding 14. Thus, refractive index $n_0$ of core 12 is in fact an average refractive index. Likewise, refractive index $n_1$ of depressed cladding 14 is also an average refractive index. Meanwhile, refractive index $n_2$ of secondary cladding 16 is also an average refractive index. The actual value of the refractive index in secondary cladding 16 exhibits comparatively low variability as a function of radius because refractive index $n_2$ is not attained by doping.

Figure 2B:
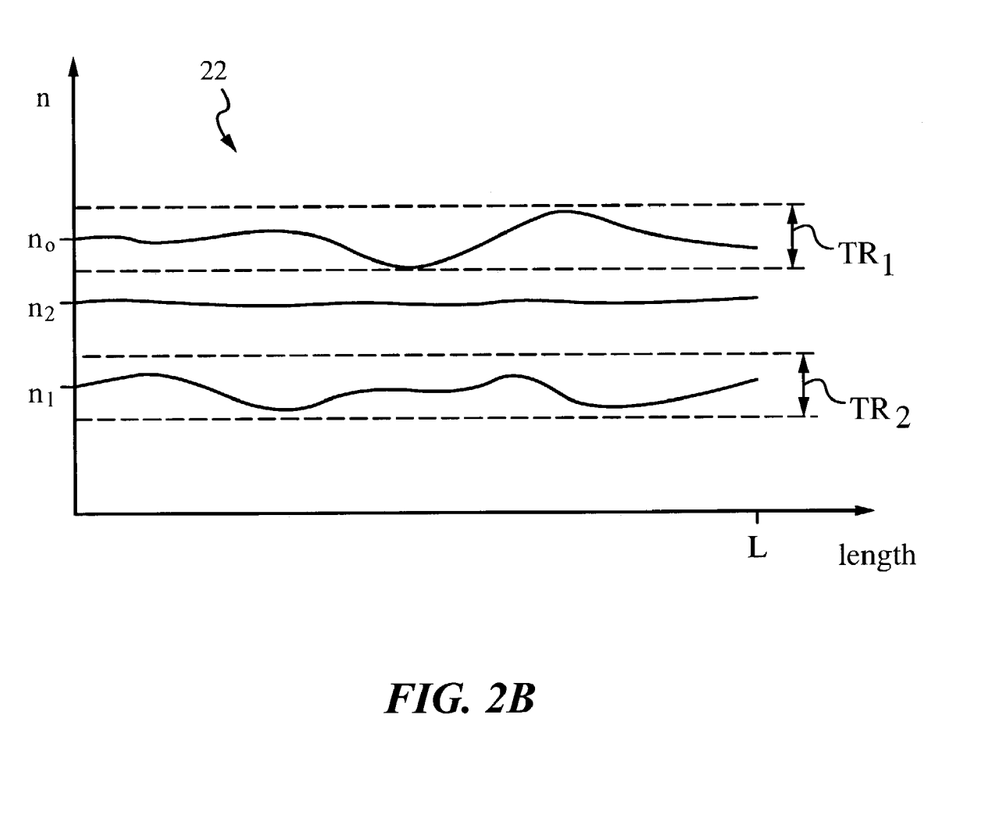
FIG. 2B is a graph illustrating the longitudinal portion of the refractive index profile in the preform of FIG. 1.

In addition to exhibiting radial variation, actual refractive index profile 22 also varies as a function of position along an axis 27 of preform 10. In other words, profile 22 has a longitudinal portion varying along the length of preform 10. Preform 10 has a total length L and the variation of the refractive index at preselected radii as a function of length is illustrated in the graphs of FIG. 2B. Once again, refractive indices $n_0$ and $n_1$ are average refractive indices while the actual refractive index values exhibit a large variation. Meanwhile, refractive index $n_2$ is also an average refractive index while the actual refractive index value remains relatively constant. Depending on the specifics of the manufacturing processes, the actual refractive index values in core 12 and depressed cladding 14 exhibit tolerance ranges $TR_1$ and $TR_2$ that may approach up to 20% along the length of axis 27.

FIG. 1 indicates how short-pass fiber 20 is obtained by drawing or pulling preform 10 from an initial cross sectional area $A_o$ to a final total cross sectional area $A_f$. Initial and final cross sectional areas are equal to:

$$A_o = \pi r_{sc}^2, \text{ and}$$

$$A_f = \pi r_2^2,$$

where $r_2$ is the radius of secondary cladding in pulled short-pass fiber 20. A drawing ratio DR is defined as the ratio of the radius of the fiber to the radius of the preform:

$$DR = \frac{r_2}{r_{sc}}$$

Since the refractive indices are nearly preserved during the pulling process, the average index $n_0$ of core 12 is significantly higher than the average index $n_1$ of depressed cladding 14 and average index $n_2$ of secondary cladding 16 in pulled short-pass fiber 20. Now, the drawing ratio DR by which preform 10 is to be pulled to obtain radii $r_0$, $r_1$, $r_2$ corresponding to core 12, depressed cladding 14 and secondary cladding 16 in pulled short-pass fiber 20 is made to achieve certain guiding properties in short-pass fiber 20. Specifically, the indices and radii are selected to produce a fundamental mode cutoff wavelength $\lambda_c$ such that light in the fundamental mode at wavelengths smaller than $\lambda_c$ is retained in core 12 while light in fundamental mode at wavelength $\lambda_c$ or longer wavelengths is lost to secondary cladding 16 over a short distance. This objective is accomplished by ensuring that pulled short-pass fiber 20 exhibits the appropriate average refractive indices $n_0$, $n_1$, $n_2$ and cross-sections or radii $r_0$, $r_1$, $r_2$. In other words, this goal is accomplished by appropriately engineering refractive index profile 22 and cross-sections of core 12, depressed cladding 14 and secondary cladding 16, or, still differently put, by obtaining the appropriate W-profile in short-pass fiber 20.

Figure 3:
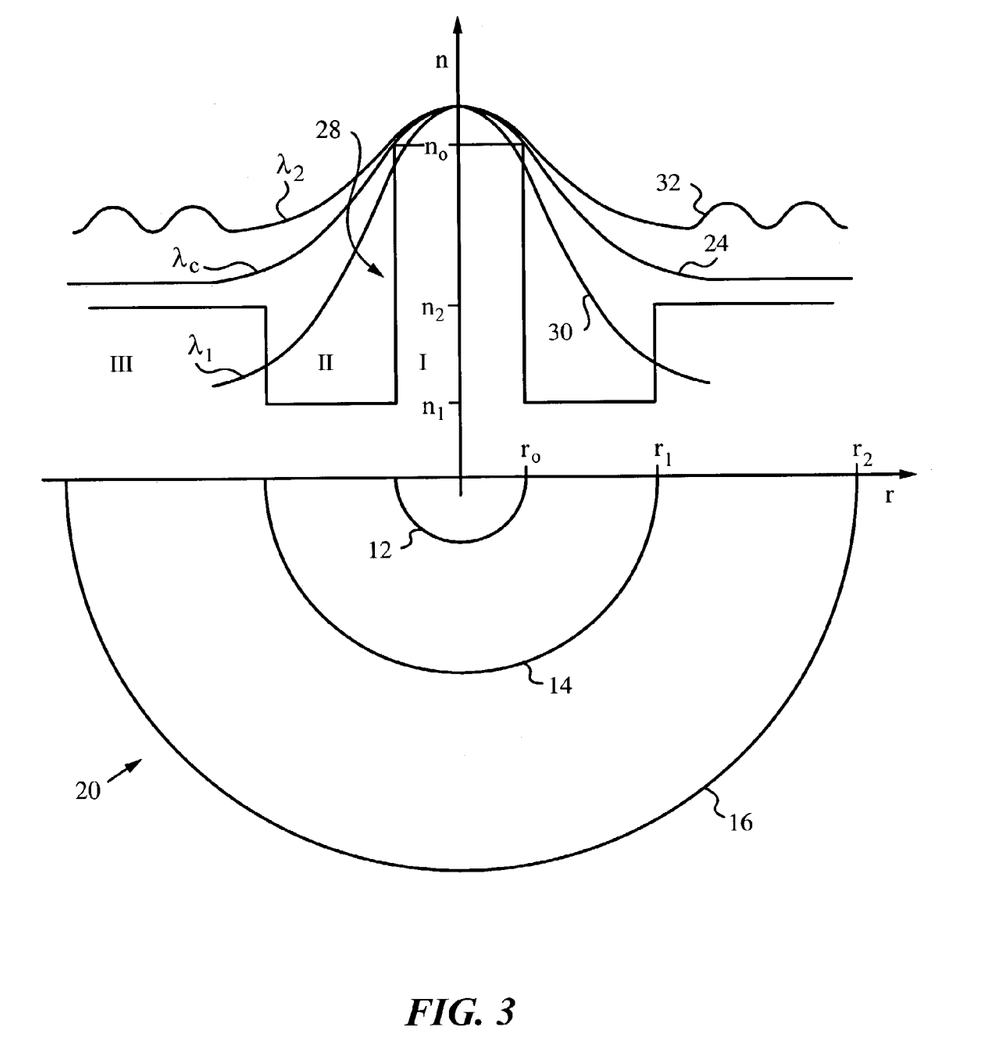
FIG. 3 is a cross-sectional diagram illustrating a W-profile in a short-pass fiber and its effect of fundamental mode cutoff wavelength.

To better illustrate the engineering of a W-profile 28 in short-pass fiber 20 we now refer to FIG. 3 illustrating a diagram of a portion of the total cross-section of short-pass fiber 20. A region I associated with core 12 extends from $0 \leq r \leq r_0$; depressed cladding 14 and secondary cladding 16 occupy regions II and III extending between $r_0 \leq r \leq r_1$ and $r_1 \leq r \leq r_2$, respectively. The graph positioned above the partial cross-section shows W-profile 28 in short-pass fiber 20. It should be noted that in the present embodiment short-pass fiber 20 is a single mode fiber.

Now, W-profile 28 is engineered to produce a fundamental mode cutoff wavelength $\lambda_c$ such that light propagating in the fundamental mode at wavelengths smaller than $\lambda_c$, such as light 30 at a wavelength $\lambda_1 < \lambda_c$ is retained in core 12. (Light 30 is illustrated in FIG. 3 by a graph of intensity vs. radius) At the same time, light 32 propagating in the fundamental mode at a wavelength $\lambda_2$ larger than $\lambda_c$, $\lambda_c < \lambda_2$ is lost to secondary cladding 16 over a short distance. Light 34 propagating in the fundamental mode at cutoff wavelength $\lambda_c$ just manages to be retained in core 12. Thus, fundamental mode cutoff wavelength $\lambda_c$ of short-pass fiber 20 is a wavelength at which the fundamental mode (the $LP_{01}$ mode) transitions from low-losses to high losses in core 12, i.e., is cut off from core 12.

The fundamental mode cutoff wavelength $\lambda_c$ for short-pass fiber 20 is set in accordance with selection rules for cross-sections and refractive indices $n_0$, $n_1$ and $n_2$ of short-pass fiber 20 as derived from Maxwell's equations. In the weak guiding approximation (which is valid when the indices of refraction of core 12 and claddings 14, 16 are all relatively close to each other), the Maxwell vector equations can be replaced with a scalar equation. The scalar $\psi$ represents the strength of the transverse electric field in the fiber. For more information, see for example G. Agrawal, "Non-linear Fiber Optics" (Academic, San Diego, 1995), D. Marcuse, "Light Transmission Optics" (Van Nostrand, Princeton, 1972), and D. Marcuse, "Theory of Dielectric Optical Waveguides" (Academic, New York, 1974).

For convenience, let us define the following parameters:

$$u_0 = \sqrt{n_0^2 - n_2^2} \text{ and } u_1 = \sqrt{n_2^2 - n_1^2} \quad (1)$$

The scalar field $\psi$ inside short-pass fiber 20 satisfies a wave equation whose solutions are Bessel functions and modified Bessel functions. For the fundamental mode supported by short-pass fiber 20, inside core 12 the scalar field $\psi$ is thus:

$$\psi = J_0(\kappa r), \ 0 \leq r \leq r_0 \text{ (region I)} \quad (2)$$

where $\kappa$ is an eigenvalue that needs to be determined, and $J_0$ is the zeroth Bessel's function. Inside depressed cladding 14, the scalar field $\psi$ is:

$$\psi = AK_0(\beta r) + BI_0(\beta r), \ r_0 \leq r \leq r_1 \text{ (region II)} \quad (3)$$

where A and B are constants to be determined, $\beta^2 = (u_0^2 + u_1^2)(2\pi/\lambda)^2 - \kappa^2$, and $K_0$ and $I_0$ are the modified Bessel's functions. Here $\lambda$ is the vacuum wavelength of the light. In secondary cladding 16, we obtain:

$$\psi = CK_0(\gamma r), \ r \geq r_1 \text{ (region III)} \quad (4)$$

Here C is another constant, and $\gamma^2 = u_0^2(2\pi/\lambda)^2 - \kappa^2$. A, B, C, and $\kappa$ are found using the boundary conditions, which require that $\psi$ and its first derivative are both continuous at $r_0$ and $r_1$. It can be shown that fundamental mode cutoff wavelength $\lambda_c$ is a wavelength $\lambda$ at which $\gamma=0$. (See for example, Cohen et al., IEEE J. Quant. Electron. QE-18 (1982) 1467–1472.) For additional convenience, let us define the following parameters:

$$x = \frac{2\pi u_0 r_0}{\lambda_c}, \ \rho = u_1/u_0, \ s = r_1/r_0. \quad (5)$$

Now, fundamental mode cutoff wavelength $\lambda_c$ can be determined if parameter x is determined. That determination can be made with the aid of algebra known to a person skilled in the art, since parameter x is the root of the following equation:

$$\rho J_0(x) K_1(\rho x) I_1(\rho s x) - \rho J_0(x) I_1(\rho x) K_1(\rho s x) - J_1(x) K_1(\rho s x) I_0(\rho x) - J_1(x) I_1(\rho s x) K_0(\rho x) = 0. \quad (6)$$

Three observations should be made regarding the parameter x. First, x does not exist for all values of s and $\rho$. For example, for $p=1$ and $s \leq \sqrt{2}$, there is no x that satisfies Eq. (6). This means that all wavelengths are guided in core 12 in this regime. The criterion that Eq. (6) have a solution is:

$$s^2 \geq 1 + 1/\rho^2. \quad (7)$$

Second, for practical applications x cannot be too small. This is because, according to Eq. (5), the parameter x is proportional to radius $r_0$ of core 12, and the radius has to be large enough that it is easy to couple light into and out of core 12. (A smaller core 12 also makes the nonlinear effects stronger, which is often a disadvantage.) Therefore, since $x = 2\pi u_0 r_0/\lambda_c$, preferably $x \geq 1$. This implies that $\rho \geq 0.224$ or, in terms of the refractive indices $(n_2^2 - n_1^2)/(n_0^2 - n_2^2) \geq 0.224$.

Third, for larger values of s, the value of x only weakly depends on s. Thus it is advantageous to have a fiber in this region of parameter space, since a manufacturing flaw producing an error in s will have a small effect on the value of fundamental mode cutoff wavelength $\lambda_c$. Therefore, it is convenient to use the rule $s \geq 1 + 1/\rho$, or in terms of the refractive indices:

$$\frac{r_1}{r_0} \geq 1 + \sqrt{(n_0^2 - n_2^2)/(n_2^2 - n_1^2)}. \quad (8)$$

The selection of cross sections and refractive indices of core 12, depressed cladding 14 and outer cladding 16 is guided by the above rules in setting the appropriate fundamental mode cutoff wavelength $\lambda_c$. First, $\lambda_c$ can be pre-selected, e.g. a wavelength close to 1530 nm, and then convenient values are selected for $u_0$ and $r_0$. Based on these choices x is computed from equation 5, and conveniently $x \geq 1$ (otherwise the previous choices can be adjusted). Then, suitable values of s and ρ are found using equation 6. A range of values for ρ and s will yield desired $\lambda_c$. Typically, all values of ρ are larger than 0.224. In addition, the rule of equation 8 is used to further narrow the range of suitable values of ρ and s.

Finally, the values of s and ρ have an additional limitation. Namely, they must be selected so that core 12 of short-pass fiber 20 has a great enough loss, e.g., 100 dB/m or even 200 dB/m or more at a wavelength $\lambda > \lambda_c$. To find the loss at wavelength $\lambda > \lambda_c$, the fiber modes for light having wavelength $\lambda > \lambda_c$ are required.

Equations (2), (3), and (4) specify the fundamental mode when $\lambda < \lambda_c$. When $\lambda > \lambda_c$, the function ψ is oscillatory, rather than exponentially decaying, in secondary cladding 16. Therefore when $\lambda > \lambda_c$, Eq. (4) is replaced by:

$$\psi = CJ_0(qr) + DN_0(qr), r \geq r_1 \text{ (region III)} \quad (9)$$

where $N_0$ (also called $Y_0$) is the zeroth Neumann function, $q^2 = \kappa^2 - u_0^2(2\pi/\lambda)^2$, and C and D are constants to be determined.

There are two key items to note regarding the modes for $\lambda > \lambda_c$. First, there are five unknowns (A, B, C, D, and κ) and four boundary conditions (continuity of ψ and dψ/dr at $r_0$ and $r_1$). The equations are underconstrained: κ may be chosen to be any value between 0 and $(2\pi/\lambda)\sqrt{u_0^2 + u_1^2}$. Thus, there is a continuum of states for each $\lambda > \lambda_c$, corresponding to the continuum of values that κ may have. This situation is quite different from the case $\lambda < \lambda_c$, where four unknowns (A, B, C, and κ) are fixed by the four boundary conditions, resulting in κ being a discrete eigenvalue having a unique value at each $\lambda < \lambda_c$.

Second, the modes specified by Eqs. (2), (3), and (9) are eigenmodes of the fiber, e.g. a W-profile fiber; however, these modes do not correspond to the situation that is physically realized. This is a result of Eq. (9) containing both incoming and outgoing waves, whereas in practice only outgoing waves are present (the light at wavelength $\lambda > \lambda_c$ originally propagating in core 12 radiates out).

Nevertheless, the modes of Eqs. (2), (3), and (9) can be used to estimate the losses at wavelengths greater than $\lambda_c$. First, for a given wavelength λ, find the value of κ that minimizes $C^2 + D^2$. This corresponds to the mode that is the most long-lived within the core. (An analogy can be made between the wave equation for the scalar ψ in the fiber and the quantum mechanical wave equation for a particle in a potential well. Then the quantum mechanical results can be borrowed. See for example David Bohm, "Quantum Theory", Dover 1989, Chapter 12, §14–22.)

Second, once κ is found in the above manner, the outgoing waves can be computed from Eq. (9). These outgoing waves give a reasonable estimation of the loss from core 12 into secondary cladding 18, even when no incoming waves are present. These outgoing waves will cause the beam at wavelength $\lambda > \lambda_c$ propagating in core 12 to be attenuated along the length of short-pass fiber 20. If the beam has power P, then the change in power P with distance z along short-pass fiber 20 is described by the equation:

$$\frac{dP}{dz} = -\Lambda P. \quad (10)$$

The loss is given by the coefficient Λ, which is approximately:

$$\Lambda = \frac{\lambda}{4\pi^2 n_0} \frac{C^2 + D^2}{\int_0^{r_0} r \, dr \psi^* \psi}. \quad (11)$$

The loss Λ, having units of m$^{-1}$, can be converted to a loss β in units of dB/m, using the relation:

$$\beta = 10 \log_{10}(e) \cdot \Lambda. \quad (12)$$

Here the term "loss" refers to radiation that leaks out of core 12 into secondary cladding 16. In fact, the radiation may not be truly lost from short-pass fiber 20, if it remains in secondary cladding 16. In some cases this will be sufficient. In other cases light from secondary cladding 16 can be out-coupled, as necessary.

Another method for calculating the losses involves calculating the complex propagation constant of the leaky fundamental mode of short-pass fiber 20. Leaky modes are discussed in, for example, D. Marcuse, "Theory of Dielectric Optical Waveguides" (Academic, New York, 1974) Chapter 1. The loss is related to the imaginary part of the complex propagation constant of the leaky mode. The complex propagation constant, or its equivalent that is the complex effective index of refraction, may be computed using commercially available software, such as that obtainable from Optiwave Corporation of Nepean, ON, Canada.

In some cases it may be preferable to numerically solve for the modes of a given fiber rather than use the Bessel function approach outlined above, since real fibers do not have the idealized step index profile indicated by W-profile 28 shown in FIG. 3, but have variations from the ideal as shown by index profile 22 shown in FIGS. 2A&B. Numerical solutions can, more easily than the method described above, take into account the actual variations in refractive index as a function of radius. Such numerical calculations can again give fundamental mode cutoff wavelength $\lambda_c$ and fiber losses as a function of fiber parameters including cross-sections and refractive indices, allowing short-pass fiber 20 to be designed to exhibit the desired features.

When Eq. (11) is used to estimate the loss, average refractive indices $n_0$, $n_1$, and $n_2$ are used. Also, the index of refraction n is not necessarily radially symmetric. If the cross section of short-pass fiber 20 is described by polar coordinates r and θ the refractive index may depend upon the angle θ as well as the radius r. Thus, n=n(r,θ). Such an asymmetric fiber may be desirable for polarization maintenance, for example.

Here is the prerequisite for the fiber to have fundamental mode cutoff wavelength $\lambda_c$. Let R be a radius large enough that the index at radius R has substantially leveled off to the value $n_2$. Then short-pass fiber 20 will have fundamental mode cutoff wavelength $\lambda_c$ if (see B. Simon, Ann. Phys. 97 (1976), pp. 279):

$$\int_0^{2\pi} d\theta \int_0^R r \, dr (n^2(r, \theta) - n_2^2) \leq 0. \quad (13)$$

Note that given the profile of FIG. 1, Eq. (13) becomes:

$$\pi r_0^2 u_0^2 - \pi (r_1^2 - r_0^2) u_1^2 \leq 0, \quad (14)$$

which is equivalent to Eq. (7) above.

Fundamental mode cutoff wavelength $\lambda_c$ is the largest wavelength for which there is an eigenmode that is localized in region I. The losses for wavelengths above cutoff wavelength $\lambda_c$ can be determined, for example, by (i) solving for the modes that are not localized but include incoming and outgoing waves, (ii) for each wavelength finding the mode with the smallest outgoing intensity, and (iii) using this outgoing intensity to estimate the loss. As discussed above, other methods are also available to a person skilled in the art for calculating losses. In general, short-pass fiber 20 with a desired fundamental mode cutoff wavelength $\lambda_c$ and losses can therefore be designed by adjusting the profile $n(r,\theta)$, which is equivalent to adjusting the cross-sections and refractive indices of core 12, depressed cladding 14 and secondary cladding 16.

In accordance with the invention, the above-described rules are used to determine the requisite indices and cross-sections to obtain a desired fundamental mode cutoff wavelength $\lambda_c$ in short-pass fiber 20. Now, in any practical short-pass fiber 20 the depressed cladding cross-section has to be larger than the core cross-section. This is ensured by selecting the core cross-section $A_c$ smaller than depressed cladding cross-section $A_{dc}$ in preform 10. Specifically, in preform 10 core cross-section is equal to:

$$A_c = \pi r_c^2, \quad (15)$$

while the depressed cladding cross section is equal to:

$$A_{dc} = \pi(r_{dc}^2 - r_c^2). \quad (16)$$

It should be noted, that the aerial ratio established between core and depressed cladding cross-sections ($A_c/A_{dc}$) will be preserved during the pulling of preform 10 into short-pass fiber 20. Likewise, the values of average refractive indices $n_0$, $n_1$, $n_2$ are nearly preserved during the pulling.

Figure 4:
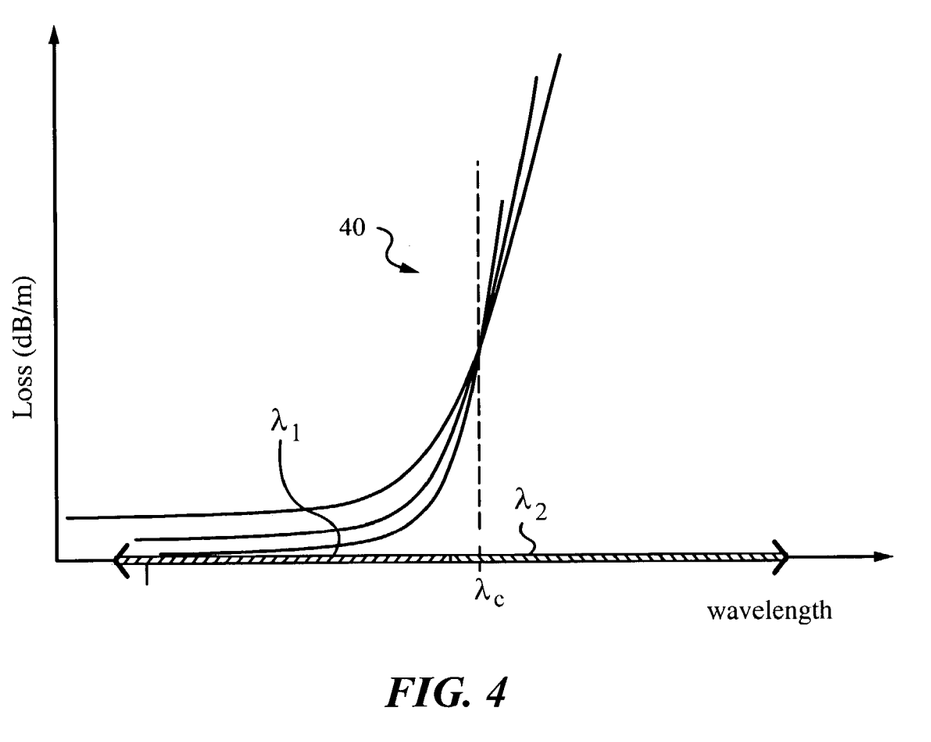
FIG. 4 are graphs of exemplary roll-off loss curves obtained with the method of the invention.

The values of $r_0$, $r_1$, $n_0$, $n_1$, and $n_2$ in short-pass fiber 20 not only define fundamental mode cutoff wavelength $\lambda_c$ but also define a roll-off loss curve with respect to wavelength. FIG. 4 illustrates an exemplary family of loss curves 40 for the same fundamental mode cutoff wavelength $\lambda_c$. It has been found that only the cutoff wavelength $\lambda_c$ gets displaced during the pulling of short-pass fiber 20 from preform 10. In other words, the overall shapes of roll-off loss curves 40 are basically preserved.

Unfortunately, the actual fundamental cutoff wavelength will differ from point to point along axis 27 due to the variation in index profile 22 along axis 27. In fact, given that tolerances $TR_1$ and $TR_2$ for refractive indices $n_0$ and $n_1$ vary up to 20% (see FIG. 2B), the actual cutoff wavelength can fluctuate by up to about 20%. Therefore, it is clearly not feasible to simply pull preform 10 at the computed drawing ratio DR to produce short-pass fiber 20 with the calculated fundamental mode cutoff wavelength $\lambda_c$.

Thus, in accordance with the method of invention, a minimum fundamental mode cutoff wavelength $\lambda_m$ is set before pulling preform 10. Specifically, minimum cutoff wavelength $\lambda_m$ is set to be the smallest possible value that cutoff wavelength $\lambda_c$ can assume at any point along axis 27 in pulled short-pass fiber 20.

Furthermore, core cross-section $A_c$ and depressed cladding cross-section $A_{dc}$ are measured in preform 10 before pulling. In the present embodiment, where core 12 and depressed cladding 14 are circular this is done by measuring radii $r_c$, $r_{dc}$ and using the equations given above. Preferably, the values of radii $r_c$, $r_{dc}$ are measured at a number of locations along axis 27 to obtain average values.

The longitudinal portion of refractive index profile 22 in core 12 and depressed cladding 14 is measured along axis 27 of preform 10 as well. This is conveniently performed by taking measurements of actual values of refractive indices $n_0$, $n_1$ at regular intervals along axis 27 and at a number of radii to thus obtain the average values of refractive indices $n_0$, $n_1$. Such measurements can be performed by deflection tomography, which is well known in the art of optical fiber preform characterization. It is also convenient to plot the measurements of refractive indices $n_0$, $n_1$ in the form of a graph of average values at each point along axis 27, similar to the graph shown in FIG. 2A.

Now, in accordance with the invention drawing ratio DR is derived from measured core cross-section $A_c$, depressed cladding cross-section $A_{dc}$ and the variation in indices $n_0$, $n_1$ determined in preform 10. In particular, drawing ratio DR is set to achieve a final value of core cross-section $A'_c$. In this embodiment final value of core cross-section $A'_c$ is defined by the final core radius $r_0$ to be obtained in short-pass fiber 20. This is done such that, given a final depressed cladding cross section $A'_{dc}$ and indices $n_0$, $n_1$ final core radius $r_0$ defines fundamental mode cutoff wavelength $\lambda_c$ such that $\lambda_c \geq \lambda_m$ at all points along axis 27. Preferably, $\lambda_m$ is set at least 5 nm below a lowest value of fundamental cutoff wavelength $\lambda_c$ along axis 27. This is done as a precaution so that subsequent fine adjustment of fundamental mode cutoff wavelength $\lambda_c$ in pulled short-pass fiber 20 is still possible by standard techniques, such as stressing or bending of the fiber.

Referring back to FIG. 1, in the next step preform 10 is pulled by drawing ratio DR determined in accordance with the above-defined rules. It is important to get as close as possible to the desired core radius $r_0$ during this pull. For example, when core radius $r_0$ is within 0.5% of the desired core radius, the error in cutoff wavelength $\lambda_c$ is within 0.5%. This corresponds to a 5 nm error in cutoff wavelength $\lambda_c$ when operating at a wavelength of 1.0 micron and an 8 nm error when operating at a wavelength of 1525 nm. This type of error is barely acceptable for short-pass fibers used for S-band amplification with Er-doped fiber, and is more than adequate for short-pass fibers used for amplification at 980 nm with Nd-doped fiber.

In accordance with a preferred embodiment a short pilot section or test section 34 of preform 10 is pulled first by drawing ratio DR. The pulling of test section 34, sometimes also referred to as pilot draw, aids in eliminating systematical errors. That is because the process of pulling can modify index profile 22. For example, the pulling process tends to produce a smoothing of index profile 22 due to melting of the glass during the pulling process. Melting tends to shift actual fundamental mode cutoff wavelength $\lambda_c$ to shorter or longer wavelengths depending on the details of the design of refractive index profile 22 of perform 10 and any index raising or lowering materials it uses. For example, index-lowering dopants consisting of small atoms such as Fluorine diffuse easily in softened silica glass. Thus, an index-lowering dopant such as Fluorine diffuses into core 12 and shifts cutoff wavelength $\lambda_c$ to a shorter wavelength. This is problematic when depressed cladding 14 is deep and wide, so that significant diffusion into core 12 occurs without appreciably affecting the average refractive index of depressed cladding 14. Thus, the pilot draw is useful because the smoothing of profile 22 cannot be calculated or modeled with sufficient accuracy to determine its effect on fundamental mode cutoff wavelength $\lambda_c$.

After pulling of test section 34 fundamental mode cutoff wavelength $\lambda_c$ is determined in pulled test section 34. This is preferably done at several points along axis 27. Clearly, it is important to choose test section 34 long enough to be representative of preform 10 and hence of short-pass fiber 20 that will be pulled from preform 10. For this reason test section 34 should be chosen to be between a few percent and up to 20 percent of length L. The cutoff wavelength may be determined experimentally as the wavelength at which light is lost from the core at a significantly high rate, for example, at 10 dB/m or 40 dB/m.

Based on the deviation of fundamental mode cutoff wavelength $\lambda_c$ measured in pulled test section 34 drawing ratio DR is adjusted to an adjusted drawing ratio DR' as follows:

$$DR' = DR \cdot \frac{\text{desired } \lambda_c}{\text{measured } \lambda_c}$$

Then the remainder of preform 10 is pulled by adjusted drawing ratio DR' to produce short-pass fiber 20.

This preferred embodiment of the method is especially useful in situations when preform 10 exhibits a sufficiently high uniformity such as about 0.5% for radii or indices. At this level of uniformity compensation for dopant diffusion and other systematic effects is very effective. However, even in cases where such uniformity is not present, it is still convenient to pull test section 34 and measure the deviation of fundamental mode cutoff wavelength $\lambda_c$ in test section 34 to determine adjusted drawing ratio DR' for pulling the remainder of preform 10.

In an alternative embodiment, drawing ratio DR is varied as the preform is pulled to compensate for the variations in refractive index graphed in FIG. 2B. This variable drawing ratio DR(z) is used to obtain an approximately constant cutoff wavelength $\lambda c$ along the length of the fiber. As above, the variable drawing ratio DR(z) may be multiplied by a factor $\lambda_c(\text{desired})/\lambda_c(\text{measured})$ once the cutoff wavelength of the test section is measured, to compensate for systematic errors due to the pulling process.

In some embodiments of the method secondary cladding cross-section is adjusted before the pulling step. In the present embodiment this is done by increasing or decreasing secondary cladding radius $r_{sc}$. For example, radius $r_{sc}$ of secondary cladding 16 is augmented by a rod-in-tube (also sometimes called "sleeving") technique or outside vapor deposition (OVD). Alternatively, radius $r_{sc}$ of secondary cladding 16 is reduced by a technique such as etching. For more information on these techniques the reader is referred to *Erbium-Doped Fiber Amplifiers Fundamentals and Technology* by P. C. Becker, N. A. Olsson, and J. R. Simpson, chapter 2 (Optical Fiber Fabrication), published by Academic Press, pp. 13–42. The necessity to augment or reduce secondary cladding cross-section before pulling it arises when the pulled fiber is supposed to have a certain, e.g., standard, outside diameter (OD), such as 125+/−1 microns or 80+/−1 microns. It is important to maintain standard fiber OD when low loss splicing to standard single mode fiber is required. The remainder of the method is performed in accordance with the above-discussed principles for designing short-pass fiber 20.

The method of invention can be used for pulling short-pass fibers to obtain ≈5 nm control of fundamental mode cutoff wavelength $\lambda_c$ in performs with random variations in index or cross sections of up to 20%. Without the method such variations cause >100 nm unpredictable shifts in fundamental mode cutoff wavelength $\lambda_c$. This advantage can be obtained even when systematic shifts are present.

Fundamental cutoff wavelength $\lambda_c$ in pulled short-pass fiber 20 can be further adjusted by stressing or coiling fiber 20 in accordance with well-known principles. That is because the fundamental mode cutoff wavelength $\lambda_c$ gets displaced during coiling of short-pass fiber 20 relative to the fundamental mode cutoff wavelength of short-pass fiber 20 when straight. Meanwhile, the overall shape of roll-off loss curves 40, as shown in FIG. 4 is basically preserved. Hence, one can use the coiling diameter of short-pass fiber 20 to make fine-tuning adjustments to fundamental mode cutoff wavelength $\lambda_c$ after short-pass fiber 20 has been drawn from preform 10. This can be done to compensate for slight errors in selecting the correct drawing ratio DR, or to compensate for slight errors in pulling to an adjusted drawing ratio DR'. This can also be done to compensate for slight shifts in fundamental mode cutoff wavelength $\lambda_c$ resulting from diffusion of dopants in short-pass fiber 20 during the pulling process, or to compensate for slight variations in the longitudinal portion of refractive index profile 22 of perform 10 along axis 27.

Alternatively, it is also possible to determine drawing ratio DR with a particular coiling radius in mind. This is frequently the case when short-pass fiber 20 is to be packaged in a box of prescribed dimensions. The effect of coiling on cutoff wavelength $\lambda_c$ is considered in determining drawing ratio DR in these situations. Specifically, since decreasing the coiling diameter (smaller coil) shifts cutoff wavelength $\lambda_c$ to shorter wavelengths the amount of shift for the desired coiling diameter has to be added when setting minimum fundamental mode cutoff wavelength $\lambda_m$ before drawing preform 10. For example, coiling a fiber at a diameter of 50 nm shifts fundamental mode cutoff wavelength $\lambda_m$ by about 20 nm to 200 nm as compared with fundamental mode cutoff wavelength $\lambda_m$ for the same fiber when straight. This shift increases approximately in proportion to the curvature (inverse of the diameter) of the fiber. The magnitude of this shift depends on the mode field diameter (MFD) of the fiber and also depends on the outside diameter (OD) of the fiber. In general, a fiber with a larger MFD is more sensitive to coiling (due to the increased stresses produced for a given bend diameter). The sensitivity to bending of a particular fiber design (i.e., given MFD, OD, etc.) can be measured at the pilot draw stage.

In the embodiments discussed above the cross-sections described by radii $r_c$, $r_{dc}$ and $r_{sc}$ in preform 10 exhibit only small variation along the length of preform 10 or along axis 27 and hence do not cause significant variations of final cross-sections described by radius $r_0$ or radii $r_1$, $r_2$ in pulled short-pass fiber 20 along axis 27. In fact, when the variations in drawing ratio DR, radii and indices (i.e., the corresponding tolerances in DR, radii and indices) remain within 0.3% in preform 10 the resulting pulled fiber will have sufficient performance to amplify signals in the S-band. For other bands, such as the C- and L-bands the tolerances are even greater.

A person skilled in the art will realize that the method of invention can be employed for pulling any type of short-pass fiber. In particular, it is possible to pull fibers with active cores, e.g., Er or Th doped cores. The same steps as described above can be used in pulling such fibers, and the additional effects on the refractive indices introduced by the active dopants will typically be automatically included in the measurements of refractive index profile and fundamental mode cutoff wavelength $\lambda_c$.

It will be clear to one skilled in the art that the above embodiments may be altered in many ways without departing from the scope of the invention. Accordingly, the scope of the invention should be determined by the following claims and their legal equivalents.

What is claimed is:

1. A method of producing a short-pass fiber comprising the following steps:
   a) producing a preform comprising:
      1) a core having a core cross-section and a refractive index $n_0$;
      2) a depressed cladding surrounding said core and having depressed cladding cross-section larger than said core cross-section and a refractive index $n_1$;
      3) a secondary cladding surrounding said depressed cladding and having a refractive index $n_2$;
   b) measuring said core cross-section;
   c) measuring said depressed cladding cross-section;
   d) setting a minimum fundamental mode cutoff wavelength $\lambda_m$;
   e) measuring a variation of said refractive index $n_0$ and said refractive index $n_1$ along said axis;
   f) deriving from measurements of said core cross-section, said depressed cladding cross-section, and said variation a drawing ratio at which said core cross-section has a final value defining a fundamental mode cutoff wavelength $\lambda_c$ such that $\lambda_c \geq \lambda_m$ along said axis;
   g) pulling said preform by said drawing ratio to produce said short-pass fiber.

2. The method of claim 1, wherein said core cross-section is circular and said final value is a final core radius.

3. The method of claim 1, further comprising adjusting a secondary cladding cross-section before said pulling step.

4. The method of claim 3, wherein said adjusting is performed by a technique selected from the group consisting of etching, rod-in-tube and outside vapor deposition.

5. The method of claim 1, wherein said minimum fundamental mode cutoff wavelength $\lambda_m$ is set at least 5 nm below a lowest value of said fundamental mode cutoff wavelength $\lambda_c$ along said axis.

6. The method of claim 1, wherein said step of pulling said preform comprises:
   a) pulling a test section of said preform by said drawing ratio;
   b) determining said fundamental mode cutoff wavelength $\lambda_c$ in said test section;
   c) adjusting said drawing ratio to an adjusted drawing ratio based on the value of said fundamental mode cutoff wavelength $\lambda_c$ in said test section; and
   d) pulling a remainder of said preform by said adjusted drawing ratio.

7. The method of claim 6, wherein said test section comprises less than 20% of said preform.

8. The method of claim 1, further comprising:
   a) measuring an average of said core cross-section along said axis;
   b) adjusting said drawing ratio to achieve an average final value of said core cross-section in said short-pass fiber.

9. The method of claim 8, wherein said core cross-section is circular and said average final value is an average final core radius.

10. A method of producing a short-pass fiber comprising:
    a) producing a preform having a core having a core cross-section and a refractive, index $n_0$, a depressed cladding surrounding said core having a depressed cladding cross-section larger than said core cross-section and a refractive index $n_1$, a secondary cladding surrounding said depressed cladding and having a refractive index $n_2$;
    b) setting a minimum fundamental mode cutoff wavelength $\lambda_m$;
    c) deriving from said core cross-section, said depressed cladding cross-section and said refractive indices $n_0$, $n_1$ a drawing ratio at which said core cross-section has a final value defining a fundamental mode cutoff wavelength $\lambda_c$ that remains above said minimum fundamental mode cutoff wavelength $\lambda_m$;
    d) pulling a test section of said preform by said drawing ratio;
    e) determining said fundamental mode cutoff wavelength $\lambda_c$ in said test section;
    f) adjusting said drawing ratio to an adjusted drawing ratio based on said fundamental mode cutoff wavelength $\lambda_c$ in said test section; and
    g) pulling a remainder of said preform by said adjusted drawing ratio to produce said short-pass fiber.

11. The method of claim 10, further comprising:
    a) determining a variation of said refractive index $n_0$ and said refractive index $n_1$ along an axis of said preform; and
    b) correcting said adjusted drawing ratio based on said variation.

12. The method of claim 10, further comprising adjusting a secondary cladding cross-section before pulling said remainder of said preform.

13. The method of claim 12, wherein said adjusting is performed by a technique selected from the group consisting of etching, rod-in-tube and outside vapor deposition.

14. The method of claim 10, wherein said minimum fundamental mode cutoff wavelength $\lambda_m$ is set at least 5 nm below a lowest value of said fundamental mode cutoff wavelength $\lambda_c$ along an axis of said preform.

15. The method of claim 10, wherein said test section comprises less than 20% of said preform.

16. The method of claim 10, wherein said core cross-section is circular and said final value is a final core radius.

17. The method of claim 16, further comprising:
    a) selecting said final core radius;
    b) changing said adjusted drawing ratio to achieve said final core radius in said short-pass fiber.

* * * * *

UNITED STATES PATENT AND TRADEMARK OFFICE
CERTIFICATE OF CORRECTION

PATENT NO. : 6,995,900 B2
APPLICATION NO. : 10/348802
DATED : February 7, 2006
INVENTOR(S) : Keaton et al.

It is certified that error appears in the above-identified patent and that said Letters Patent is hereby corrected as shown below:

Col. 5, line 42, " $u_0 = \overline{n_0^2 - n_2^2}$ and $u_1 = \overline{n_2^2 - n_1^2}$ " should read -- $u_0 = \sqrt{n_0^2 - n_2^2}$ and $u_1 = \sqrt{n_2^2 - n_1^2}$ --

Col. 6, line 46, " $\overline{(n_2^2 - n_1^2)/(n_0^2 - n_2^2) \geq 0.224}$ " should read

-- $\sqrt{(n_2^2 - n_1^2)/(n_0^2 - n_2^2)} \geq 0.224$ --

Col. 7, line 27, " $(2\pi/\lambda)\overline{u_0^2 + u_1^2}$ " should read -- $(2\pi/\lambda)\sqrt{u_0^2 + u_1^2}$ --

Col. 11, line 31, "λc" should read -- $\lambda_c$ --

Signed and Sealed this

Twenty-fourth Day of October, 2006

JON W. DUDAS
*Director of the United States Patent and Trademark Office*